US011962987B2

(12) United States Patent
Shen et al.

(10) Patent No.: US 11,962,987 B2
(45) Date of Patent: Apr. 16, 2024

(54) MAGNETIC CIRCUIT OF LOUDSPEAKER AND LOUDSPEAKER

(71) Applicant: SUZHOU SONAVOX ELECTRONICS CO., LTD., Jiangsu (CN)

(72) Inventors: Yuewu Shen, Jiangsu (CN); Shenggang Tao, Jiangsu (CN); Bo Gu, Jiangsu (CN); Xiaoqing Wang, Jiangsu (CN); Guoqiang Chai, Jiangsu (CN)

(73) Assignee: Suzhou Sonavox Electronics Co., Ltd., Jiangsu (CN)

(*) Notice: Subject to any disclaimer, the term of this patent is extended or adjusted under 35 U.S.C. 154(b) by 271 days.

(21) Appl. No.: 17/284,737

(22) PCT Filed: Oct. 10, 2019

(86) PCT No.: PCT/CN2019/110270
§ 371 (c)(1),
(2) Date: Apr. 12, 2021

(87) PCT Pub. No.: WO2020/078247
PCT Pub. Date: Apr. 23, 2020

(65) Prior Publication Data
US 2022/0232325 A1 Jul. 21, 2022

(30) Foreign Application Priority Data
Oct. 15, 2018 (CN) ......................... 201821669734.9

(51) Int. Cl.
*H04R 9/02* (2006.01)
*H01F 7/08* (2006.01)
(Continued)

(52) U.S. Cl.
CPC ............ *H04R 9/025* (2013.01); *H01F 7/081* (2013.01); *H04R 9/045* (2013.01); *H04R 9/06* (2013.01)

(58) Field of Classification Search
CPC . H04R 9/06; H04R 9/45; H04R 1/288; H04R 7/18; H04R 9/025; H04R 2499/11;
(Continued)

(56) References Cited

U.S. PATENT DOCUMENTS 3,881,074 A * 4/1975 Kawamura ........... H04R 9/025 335/231
4,752,963 A * 6/1988 Yamazaki ............. H04R 9/025 381/430
(Continued)

FOREIGN PATENT DOCUMENTS

CN 204014046 U * 12/2014
CN 204014046 U 12/2014
(Continued)

OTHER PUBLICATIONS

Written Opinion for International Patent Application No. PCT/CN2019/110270, dated Jan. 2, 2020 in 5 pages.

*Primary Examiner* — Carolyn R Edwards
*Assistant Examiner* — Julie X Dang
(74) *Attorney, Agent, or Firm* — Knobbe Martens Olson & Bear LLP

(57) ABSTRACT

The present disclosure relates to a magnetic circuit of a loudspeaker and a loudspeaker, which can improve the non-linearity of magnetic permeability, thereby reducing the distortion of the loudspeaker. A magnetic circuit comprises a T-yoke with a base and a columnar portion protruding upward from the base, a magnetic steel arranged on the base, and a front sheet arranged on the magnetic steel, wherein the magnetic steel and the front sheet are arranged around a periphery of the columnar portion, and a short-circuit ring is
(Continued)

arranged on an inner side of the magnetic steel and/or the front sheet. A first short-circuit ring is provided between the inner wall of the magnetic steel and the outer wall of the columnar portion, and a second short-circuit ring is provided on the inner wall of the front sheet.

14 Claims, 1 Drawing Sheet

(51) Int. Cl.
*H04R 9/04* (2006.01)
*H04R 9/06* (2006.01)

(58) Field of Classification Search
CPC ............ H04R 2400/03; H04R 2400/11; H04R 2499/15; H04R 1/345; H01F 7/081
USPC ....... 381/398, 430, 414, 420, 412, 400, 429, 381/397
See application file for complete search history.

(56) References Cited

U.S. PATENT DOCUMENTS

| | | | | |
|---|---|---|---|---|
| 8,165,336 | B2 * | 4/2012 | Iino | H04R 9/025 381/397 |
| 8,428,296 | B2 * | 4/2013 | Liu | H04R 9/046 381/409 |
| 8,781,150 | B2 * | 7/2014 | Babb | H02K 9/16 381/397 |
| 2004/0042631 | A1 * | 3/2004 | Amino | H04R 9/025 381/412 |
| 2017/0332173 | A1 | 11/2017 | Gerkinsmeyer | |
| 2022/0232325 | A1 * | 7/2022 | Shen | H04R 9/045 |

FOREIGN PATENT DOCUMENTS

| | | | |
|---|---|---|---|
| CN | 204539461 | U | 8/2015 |
| CN | 205830009 | U | 12/2016 |
| CN | 208821073 | U | 5/2019 |

* cited by examiner

MAGNETIC CIRCUIT OF LOUDSPEAKER AND LOUDSPEAKER

CROSS REFERENCE TO RELATED APPLICATION(S)

This application is the U.S. National Phase under 35 U.S.C. § 371 of International Application PCT/CN2019/110270, filed Oct. 10, 2019, which claims priority of Chinese Patent Application No. CN 201821669734.9 filed on Oct. 15, 2018, each of which is incorporated herein by reference in its entirety.

TECHNICAL FIELD

The present disclosure relates to the field of loudspeakers, in particular to a magnetic circuit of a loudspeaker and a loudspeaker.

BACKGROUND

For an electrodynamic loudspeaker with a cone diaphragm, the magnetic circuit usually includes a T-yoke, a magnetic steel and a front sheet laminated on the T-yoke. Wherein, the magnetic steel and the front sheet are arranged around a columnar protrusion in the middle of the T-yoke, and there is a gap between the magnetic steel and the columnar protrusion of the T-yoke, and there is also a gap between the front sheet and the columnar protrusion of the T-yoke. The voice coil of the vibrating system of the speaker will be inserted into the gaps, so that it can be driven by the magnetic circuit to vibrate, thereby driving the vibration of the diaphragm. However, due to the non-linear characteristics of the magnetic permeability and the non-linearity of the driving force coefficient (BL), the loudspeaker will has greater distortion during its working process.

SUMMARY

Aiming at the above problems, the present disclosure provides a magnetic circuit of a loudspeaker and a loudspeaker, which can improve the non-linearity of magnetic permeability, thereby reducing the distortion of the loudspeaker.

To achieve the above purpose, the technical solution employed by the present disclosure is:

- a magnetic circuit of a loudspeaker comprising a T-yoke with a base and a columnar portion protruding upward from the base, a magnetic steel arranged on the base, and a front sheet arranged on the magnetic steel, wherein the magnetic steel and the front sheet are arranged around a periphery of the columnar portion, and a short-circuit ring is arranged on an inner side of the magnetic steel and/or the front sheet.

In an embodiment, an inner surface of the short-circuit ring is exposed and opposite to an outer surface of the columnar portion.

In an embodiment, the short-circuit ring is located between the magnetic steel and the outer surface of the columnar portion or between the front sheet and the outer surface of the columnar portion.

In an embodiment, a first short-circuit ring is provided between the inner surface of the magnetic steel and the outer surface of the columnar portion, and a second short-circuit ring is provided on the inner surface of the front sheet.

Further, the second short-circuit ring is embedded in the inner surface of the front sheet and the inner surface of the second short-circuit ring is exposed.

Furthermore, the front sheet comprises a first front sheet and a second front sheet stacked from top to bottom, inner diameters of the first front sheet and the second front sheet are the same or different, the inner surface of the first front sheet is provided with a mounting slot, a bottom of the mounting slot extends to the second front sheet, and the second short-circuit ring is embedded in the mounting slot.

In an embodiment, the first short-circuit ring and the second short-circuit ring are annular rings surrounding the columnar portion, and materials of the first short-circuit ring and the second short-circuit ring are metal or metal alloy that cannot be magnetized; inner diameters of the first short-circuit ring and the second short-circuit ring is larger than inner diameters of the first front sheet and the second front sheet, and an outer diameter of the first short-circuit ring is smaller than an inner diameter of the magnetic steel.

In a preferred embodiment, materials of the first short-circuit ring and the second short-circuit ring are aluminum, copper, aluminum alloy or copper alloy.

In an embodiment, thicknesses of the first short-circuit ring and the second short-circuit ring are ≥0.1 mm, a height of the first short-circuit ring is ≤ a thickness of the magnetic steel, and a height of the second short-circuit ring is ≤4/5 of the sum of the thicknesses of the first front sheet and the second front sheet.

In an embodiment, the first front sheet is clamped between the second front sheet and the base of the T-yoke.

In an embodiment, an inwardly recessed groove is provided on an outer wall of the columnar portion of the T-yoke, and the groove is arranged corresponding to the second short-circuit ring.

In an embodiment, a depth of the groove is greater than 0.1 mm, a height of the groove is equal to a height of the second short-circuit ring.

In an embodiment, the short-circuit ring is a circular ring surrounding the columnar portion, and a material of the short-circuit ring is metal or metal alloy that cannot be magnetized, preferably aluminum, copper, aluminum alloy, or copper alloy.

In an embodiment, an inwardly recessed groove is provided on an outer wall of the columnar portion of the T-yoke, and the groove is arranged corresponding to the short-circuit ring.

The present disclosure further adopts the following technical solution:

- a loudspeaker, comprises the loudspeaker magnetic circuit system mentioned above.

In an embodiment, the loudspeaker further comprises a vibrating system comprising a voice coil, a gap is formed between the front sheet of the magnetic circuit and the columnar portion, and the voice coil is inserted into the gap, a short-circuit ring is provided on an inner surface of the front sheet, and an inwardly recessed groove is provided on an outer wall of the columnar portion of the T-yoke, the groove is provided corresponding to the short-circuit ring, and the short-circuit ring and the groove are respectively located on two sides of the voice coil.

Due to the use of the above solutions, the present disclosure has the following advantages over the prior art:

by providing a short-circuit ring on the inner side of the front sheet and/or the magnetic steel, the non-linearity of magnetic permeability can be improved, thereby reducing the distortion of the loudspeaker.

BRIEF DESCRIPTION OF THE DRAWINGS

For explaining the technical solutions in the embodiments of the present disclosure more clearly, the accompanying drawings used to describe the embodiments are simply introduced in the following. Apparently, the below described drawings merely show a part of the embodiments of the present disclosure, and those skilled in the art can obtain other drawings according to the accompanying drawings without creative labour.

Wherein,

10—front sheet; 1—first front sheet; 101—mounting slot; 2—second front sheet; 3—magnetic steel; 4—T-yoke; 401—base; 402—columnar part; 403—groove; 5—first short-circuit ring; 6—second short-circuit ring; 7—voice coil.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

The orientation words "inner" and "outer" mentioned in the present disclosure are defined with reference to the center line of the columnar portion of the T-yoke, and the side farther from the center line of the columnar portion is defined as "outer", and on the contrary, it is "inner".

Figure 1:
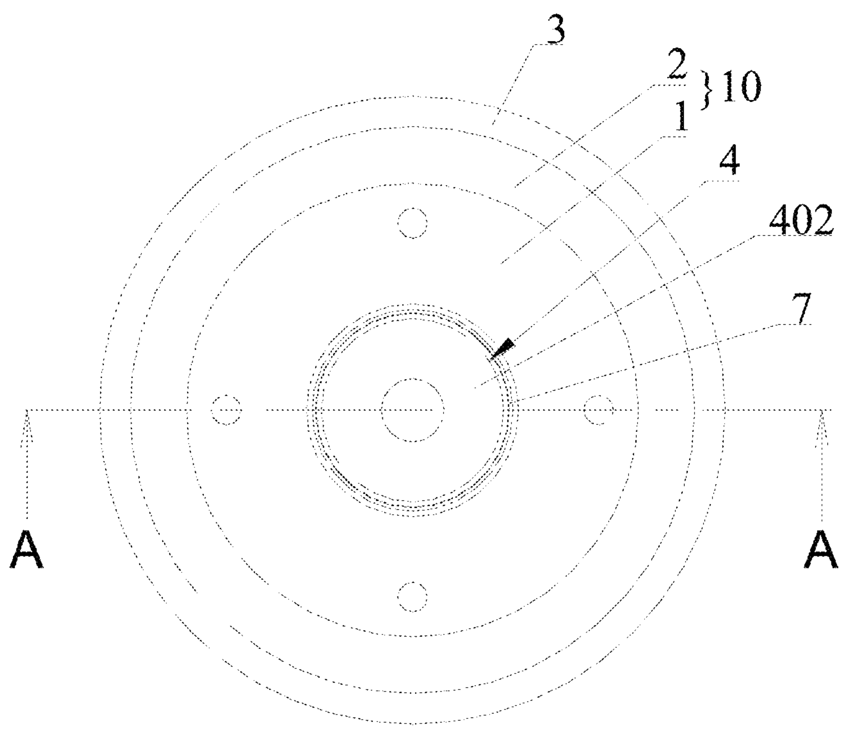
FIG. 1 is a top view of some parts of a loudspeaker according to an embodiment of the present disclosure.
Figure 2:
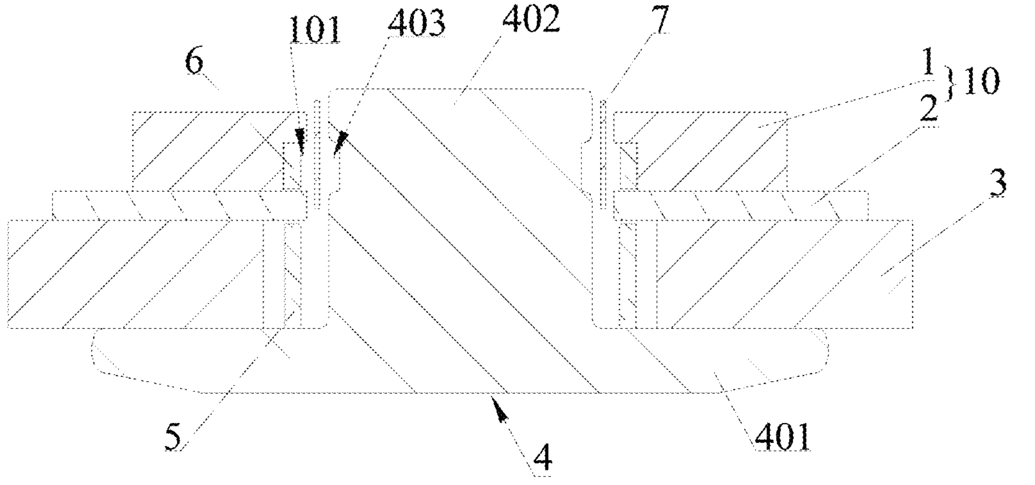
FIG. 2 is a cross-sectional view taken along the line A-A in FIG. 1.

This embodiment provides a magnetic circuit of a loudspeaker and a loudspeaker having such a magnetic circuit. Referring to FIG. 1 and FIG. 2, the magnetic circuit comprises a T-yoke 4, a magnetic steel 3, and a front sheet 10. Wherein, the T-yoke 4 comprises a base 401 and a columnar portion 402 protruding upward from the base 401, the magnetic steel 3 is arranged fixedly on the base 401, and the front sheet 10 is arranged fixedly on the magnetic steel 3, the magnetic steel 3 and the front sheet 10 are arranged around the periphery of the columnar portion 402, and a short-circuit ring is arranged on an inner side of the magnetic steel 3 and/or the front sheet 10.

In this embodiment, the front sheet 10 comprises a first front sheet 1 and a second front sheet 2 stacked from top to bottom, and the first front sheet 1, the second front sheet 2 and the magnetic steel 3 are successively stacked from top to bottom and arranged around the periphery of the columnar portion 402 of the T-yoke 4. The short-circuit ring comprises a first short-circuit ring 5 and a second short-circuit ring 6, the first short-circuit ring 5 is provided between the inner surface of the magnetic steel 3 and the outer surface of the columnar portion 402, and the second short-circuit ring 6 is provided on the inner surface of the front sheet 10, specifically, on the inner surface of the first front sheet 1 or the first front sheet 1 and the second front sheet 2. Wherein, the outer diameters of the first front sheet 1, the second front sheet 2, and the magnetic steel 3 increase successively, the inner diameters of the first front sheet 1 and the second front sheet 2 are equal and smaller than the inner diameter of the magnetic steel 3, and the columnar portion 402 of the T-yoke 4 is generally cylindrical.

The inner diameter of the first short-circuit ring 5 is greater than the inner diameters of the first front sheet 1 and the second front sheet 2, the outer diameter of the first short-circuit ring 5 is smaller than the inner diameter of the magnetic steel 3, that is, the first short-circuit ring 5 is located in the gap between the magnetic steel 3 and the columnar portion 402, and is located directly below the second front sheet 2, so as to be clamped between the second front sheet 3 and the base 401 of the T-yoke 4. The "inner diameter" mentioned herein refers to the minimum value of the distance between the inner wall of the component and the center line of the columnar portion 402.

The second short-circuit ring 6 is embedded in the inner surface of the front sheet 10. Specifically, the inner surface of the first front sheet 1 is provided with a mounting slot 101, the bottom of the mounting slot 101 extends to the second front sheet 2, and the second short-circuit ring 6 is embedded in the mounting slot 101 with its lower end surface is in contact with the second front sheet 2. The inner diameters of the first front sheet 1 and the second front sheet 2 are the same or different, in this embodiment, the inner diameters are preferably the same. The inner diameter of the second short-circuit ring 6 is greater than the inner diameters of the first front sheet 1 and the second front sheet 2.

The first short-circuit ring 5 and the second short-circuit ring 6 both are circular rings surrounding the columnar portion 402, and the materials of the first short-circuit ring 5 and the second short-circuit ring 6 are metal or metal alloy that cannot be magnetized, preferably aluminum, copper, aluminum alloy, or copper alloy. The thicknesses of the first short-circuit ring 5 and the second short-circuit ring 6 are ≥0.1 mm, the height of the first short-circuit ring 5 is ≤ the thickness of the magnetic steel 3, and the height of the second short-circuit ring 6 is ≤4/5 of the sum of the thicknesses of the first front sheet 1 and the second front sheet 2.

An inwardly recessed groove 403 is provided on the outer wall of the columnar portion 402 of the T-yoke 4, and the groove 403 is provided corresponding to the second short-circuit ring 6, and the two generally have the same height. The depth of the groove 403 is >0.1 mm, and its height is equal to the height of the second short-circuit ring 6.

The loudspeaker further comprises a vibrating system, a voice coil 7 of the vibrating sound system is inserted into the gap between the front sheet 10 and the columnar portion 402, and the second short-circuit ring 6 and the groove 403 on the columnar portion 402 are respectively located on two sides of the voice coil 7.

The above-mentioned loudspeaker magnetic circuit system and the above-mentioned loudspeaker have the following advantages:

by providing the short-circuit rings between the first front sheet 1 and the second front sheet 2 and inside the magnetic steel 3, the non-linearity of the magnetic permeability is improved; by providing the mounting slot 101 on the first front sheet 1 and the groove 403 on the T-yoke 4, the nonlinearity of the driving force coefficient (BL) is improved; the above structure reduces the distortion of the loudspeaker.

The embodiments described above are only for illustrating the technical concepts and features of the present disclosure, and are intended to make those skilled in the art being able to understand the present disclosure and thereby implement it, and should not be concluded to limit the protective scope of this disclosure.

We claim:

1. A magnetic circuit of a loudspeaker, comprising:

a T-yoke with a base and a columnar portion protruding upward from the base;

a magnetic steel arranged on the base; and a front sheet arranged on the magnetic steel, wherein the magnetic steel and the front sheet are arranged around a periphery of the columnar portion, the magnetic circuit further comprising a first short-circuit ring arranged on an inner side of the magnetic steel and a second short-circuit ring arranged on an inner side of the front sheet;

an inwardly recessed groove is provided on an outer surface of the columnar portion of the T-yoke, and the groove is provided corresponding to the second short-circuit ring and configured to be equal to the second short-circuit ring in height; and an inner surface of the front sheet is provided with a mounting slot, and the second short-circuit ring is embedded in the mounting slot, the first short-circuit ring is located below the second short-circuit ring.

2. The magnetic circuit according to claim 1, wherein inner surfaces of the first and second short-circuit rings are directly opposite to the outer surface of the columnar portion.

3. The magnetic circuit according to claim 1, wherein the first short-circuit ring is located between the magnetic steel and the outer surface of the columnar portion, and wherein the second short-circuit ring is located between the front sheet and the outer surface of the columnar portion.

4. The magnetic circuit according to claim 1, wherein the first short-circuit ring is provided between an inner surface of the magnetic steel and the outer surface of the columnar portion.

5. The magnetic circuit according to claim 4, wherein the second short-circuit ring is embedded in the inner surface of the front sheet and an inner surface of the second short-circuit ring is exposed.

6. The magnetic circuit according to claim 5, wherein the front sheet comprises a first front sheet and a second front sheet stacked from top to bottom, the mounting slot is provided on an inner surface of the first front sheet, a bottom of the mounting slot extends to the second front sheet, and a lower end surface of the second short-circuit ring is in contact with the second front sheet.

7. The magnetic circuit according to claim 6, wherein the first short-circuit ring and the second short-circuit ring are annular rings surrounding the columnar portion, and materials of the first short-circuit ring and the second short-circuit ring are metal or metal alloy that cannot be magnetized; inner diameters of the first short-circuit ring and the second short-circuit ring are larger than inner diameters of the first front sheet and the second front sheet, and an outer diameter of the first short-circuit ring is smaller than an inner diameter of the magnetic steel.

8. The magnetic circuit according to claim 7, wherein the materials of the first short-circuit ring and the second short-circuit ring are aluminum, copper, aluminum alloy or copper alloy.

9. The magnetic circuit according to claim 6, wherein thicknesses of the first short-circuit ring and the second short-circuit ring are ≥0.1 mm, a height of the first short-circuit ring is ≤ a thickness of the magnetic steel, and a height of the second short-circuit ring is ≤4/5 of the sum of the thicknesses of the first front sheet and the second front sheet.

10. The magnetic circuit according to claim 6, wherein the first short-circuit ring is clamped between the second front sheet and the base of the T-yoke.

11. The magnetic circuit according to claim 1, wherein a depth of the groove is greater than 0.1 mm, a height of the groove is equal to a height of the second short-circuit ring.

12. The magnetic circuit according to claim 1, wherein the first or second short-circuit ring is a circular ring surrounding the columnar portion, and a material of the first or second short-circuit ring is metal or metal alloy that cannot be magnetized, preferably aluminum, copper, aluminum alloy, or copper alloy.

13. A loudspeaker, comprising a loudspeaker magnetic circuit system according to claim 1.

14. The loudspeaker according to claim 13, wherein the loudspeaker further comprises a vibrating system comprising a voice coil, a gap is formed between the front sheet and the columnar portion of the magnetic circuit, and the voice coil is inserted into the gap, and the second short-circuit ring and the groove are respectively located on two sides of the voice coil.

* * * * *